US007052395B2

(12) United States Patent
Glavich et al.

(10) Patent No.: US 7,052,395 B2
(45) **Date of Patent: *May 30, 2006**

(54) GAMING DEVICE HAVING DIFFERENT SETS OF PRIMARY AND SECONDARY REEL SYMBOLS

(75) Inventors: Paulina Glavich, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/098,691

(22) Filed: Mar. 14, 2002

(65) Prior Publication Data

US 2002/0155880 A1 Oct. 24, 2002

Related U.S. Application Data

(63) Continuation of application No. 09/837,081, filed on Apr. 18, 2001, now Pat. No. 6,394,902.

(51) Int. Cl.
*A63F 13/00* (2006.01)

(52) U.S. Cl. .................................... 463/20; 273/143 R

(58) Field of Classification Search ............ 463/16–20, 463/9–13; 273/138.1, 143 R, 292

See application file for complete search history.

(56) References Cited

U.S. PATENT DOCUMENTS

| | | | | |
|---|---|---|---|---|
| 5,046,735 | A * | 9/1991 | Hamano et al. | 434/129 |
| 5,647,798 | A * | 7/1997 | Falciglia | 463/19 |
| 5,655,961 | A | 8/1997 | Acres et al. | |
| 5,823,873 | A * | 10/1998 | Moody | 463/313 |
| 6,089,977 | A | 7/2000 | Bennett | |
| 6,102,798 | A | 8/2000 | Bennett | |
| 6,126,541 | A | 10/2000 | Fuchs | |
| 6,126,542 | A | 10/2000 | Fier | |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,162,121 | A | 12/2000 | Morro et al. | |
| 6,168,520 | B1 | 1/2001 | Baerlocher et al. | |
| 6,217,448 | B1 | 4/2001 | Olsen | |
| 6,227,971 | B1 * | 5/2001 | Weiss | 273/143 R |
| 6,238,287 | B1 | 5/2001 | Komori et al. | |
| 6,270,412 | B1 * | 8/2001 | Crawford et al. | 463/20 |
| 6,290,600 | B1 * | 9/2001 | Glasson | 463/20 |
| 6,299,165 | B1 * | 10/2001 | Nagano | 273/143 R |

(Continued)

FOREIGN PATENT DOCUMENTS

EP 60019 A1 * 9/1982

(Continued)

OTHER PUBLICATIONS

Slot Machines Brochure written by Reno-Tahoe Specialty, Inc., published in 1989.

(Continued)

*Primary Examiner*—Scott Jones
(74) *Attorney, Agent, or Firm*—Bell, Boyd & Lloyd LLC

(57) ABSTRACT

The present invention includes an apparatus and method for a gaming device having a bonus game that provides a player with a primary set of reel symbols having a primary probability of winning and a secondary set of reel symbols having a secondary probability of winning, where the secondary probability of winning is greater than the primary probability of winning.

62 Claims, 5 Drawing Sheets

U.S. PATENT DOCUMENTS

| | | | | |
|---|---|---|---|---|
| 6,312,334 | B1 * | 11/2001 | Yoseloff | 273/138.1 |
| 6,315,660 | B1 * | 11/2001 | DeMar et al. | 273/138.2 |
| 6,364,766 | B1 * | 4/2002 | Anderson et al. | 273/138.1 |
| 6,439,993 | B1 * | 8/2002 | O'Halloran | 463/16 |
| 6,517,432 | B1 * | 2/2003 | Jaffe | 463/16 |
| 6,551,187 | B1 * | 4/2003 | Jaffe | 463/20 |
| 2002/0052233 | A1 * | 5/2002 | Gauselmann | 463/20 |
| 2002/0086725 | A1 * | 7/2002 | Fasbender et al. | 463/11 |

FOREIGN PATENT DOCUMENTS

| | | | | |
|---|---|---|---|---|
| EP | 0926645 | A2 | | 6/1999 |
| GB | 2101380 | A | * | 1/1983 |
| GB | 2 262 642 | A | | 6/1993 |
| WO | WO 9732285 | | | 9/1997 |

OTHER PUBLICATIONS

Little Devils Brochure written by IGT, published in 1998.
Tropical Fever Glass written by IGT, published date not known.
Winning Streak Brochure written by Aristocrat, publeshed in 1994.
Totem Pole Brochure written by IGT, published in 1997.
Slotopoly Brochure written by IGT, published in 1998.
Top Dollar Brochure written by IGT, published in 1998.
Wheel of Fortune Video Brochure written by IGT, published in 1999.
Elvis Brochure written by IGT, published in 1999.

* cited by examiner

120

| |
|---|
| ANY THREE MATCHING SYMBOLS PAYS 100 TO 1<br>EXAMPLE: A,A,A PAYS 100 TO 1 |
| ANY TWO MATCHING SYMBOLS PAYS 10 TO 1<br>EXAMPLE: B,B OR B,D,B OR A,B,B PAYS 10 TO 1 |
| ANY TWO BONUS SYMBOLS TRIGGER BONUS ROUND |

GAMING DEVICE HAVING DIFFERENT SETS OF PRIMARY AND SECONDARY REEL SYMBOLS

PRIORITY CLAIM

This application is a continuation of U.S. patent application Ser. No. 09/837,081 filed on Apr. 18, 2001 now U.S. Pat. No. 6,394,902.

CROSS REFERENCE TO RELATED APPLICATIONS

This application is related to the following commonly-owned co-pending patent applications: "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING A MULTIPLE SCREEN BONUS ROUND," Ser. No. 09/629,235, "GAMING DEVICE HAVING A MULTI-ROUND BONUS SCHEME WHEREIN EACH ROUND HAS A PROBABILITY OF SUCCESS," Ser. No. 09/688,441, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE WITH A BONUS SCHEME INVOLVING MOVEMENT ALONG PATHS WITH PATH CHANGE CONDITIONS," Ser. No. 09/686,538, "GAMING DEVICE HAVING RELATED MULTI-GAME BONUS SCHEME," Ser. No. 09/688,972, "GAMING DEVICE HAVING A RE-TRIGGERING SYMBOLS BONUS SCHEME," Ser. No. 09/981,133, "GAMING DEVICE HAVING A MULTIPLE SELECTION AND AWARD DISTRIBUTION BONUS SCHEME," Ser. No. 09/688,635, GAMING DEVICE HAVING REGENERATING MULTIPLE AWARD OPPORTUNITIES patent application Ser. No.: 09/960,784 Filed: Sep. 21, 2001 "GAMING DEVICE HAVING OFFER/ACCEPTANCE ADVANCE THRESHOLD AND LIMIT BONUS SCHEME," Ser. No. 09/838,014, "GAMING DEVICE HAVING A CENTRAL GAME AND A PLURALITY OF PERIPHERAL GAMES," U.S. Pat. No. 6,789,819, and "GAMING DEVICE HAVING A RE-TRIGGERING SYMBOL BONUS SCHEME WITH A BONUS SYMBOL ACCUMULATOR," Ser. No. 10/071,441.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more specifically to a gaming device having a different set of reel symbols for primary and secondary games, and different probabilities for each set of reel symbols to increase player excitement and enjoyment.

BACKGROUND OF THE INVENTION

Certain gaming devices, and in particular, slot machines include base or primary games and bonus or secondary games using identical symbols and sets of symbols on the reels which are displayed to the player on the same display device or on different display devices. To avoid player confusion, regulators have required that the same symbols have the same probability of winning in the primary game and in the bonus game or round. For instance, when the player obtains a bonus of ten free spins based on a predetermined combination of symbols, each free spin must provide the same probability of winning as the spin in the primary game.

It is known in the art to provide bonus games which have some of the same symbols as the symbols in the primary game to change the probability in the bonus game and to increase a player's chances of winning in the bonus game. However, using the same symbols in the primary game and in the bonus game, and then changing the associated probability related to those symbols between each game, has been prohibited in certain jurisdictions in the United States. Regulators believe that such dual use of symbols and dual probabilities relating to those similar symbols will cause player confusion. Therefore, the gaming regulators generally do not allow for the same set of symbols to have varying probabilities of winning.

Therefore, it is desirable to provide new gaming devices that eliminate confusion and increase player enjoyment and excitement.

SUMMARY OF THE INVENTION

The present invention overcomes the above shortcomings by providing a gaming device, and specifically a slot machine, which includes a set of reel symbols for the primary game having probabilities of winning for each available award and a different set of reel symbols for one or more bonus games having different probabilities of winning for each available award.

Each set of symbols preferably includes completely different symbols; however, it should be appreciated that one or relatively few symbols could be the same in each set.

In the preferred embodiment, there are less reel symbols in the set of symbols for the bonus game than the set of symbols for the primary game. The probabilities of winning in the bonus round are therefore greater than the probabilities of winning in the primary game. Additionally, the pay-outs associated with or for the bonus set of symbols is preferably larger than the pay-outs for the set of symbols in the primary game.

It is therefore an advantage of the present invention to provide a gaming machine having different sets of reel symbols for base and bonus games and different probabilities of winning the base and bonus games.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
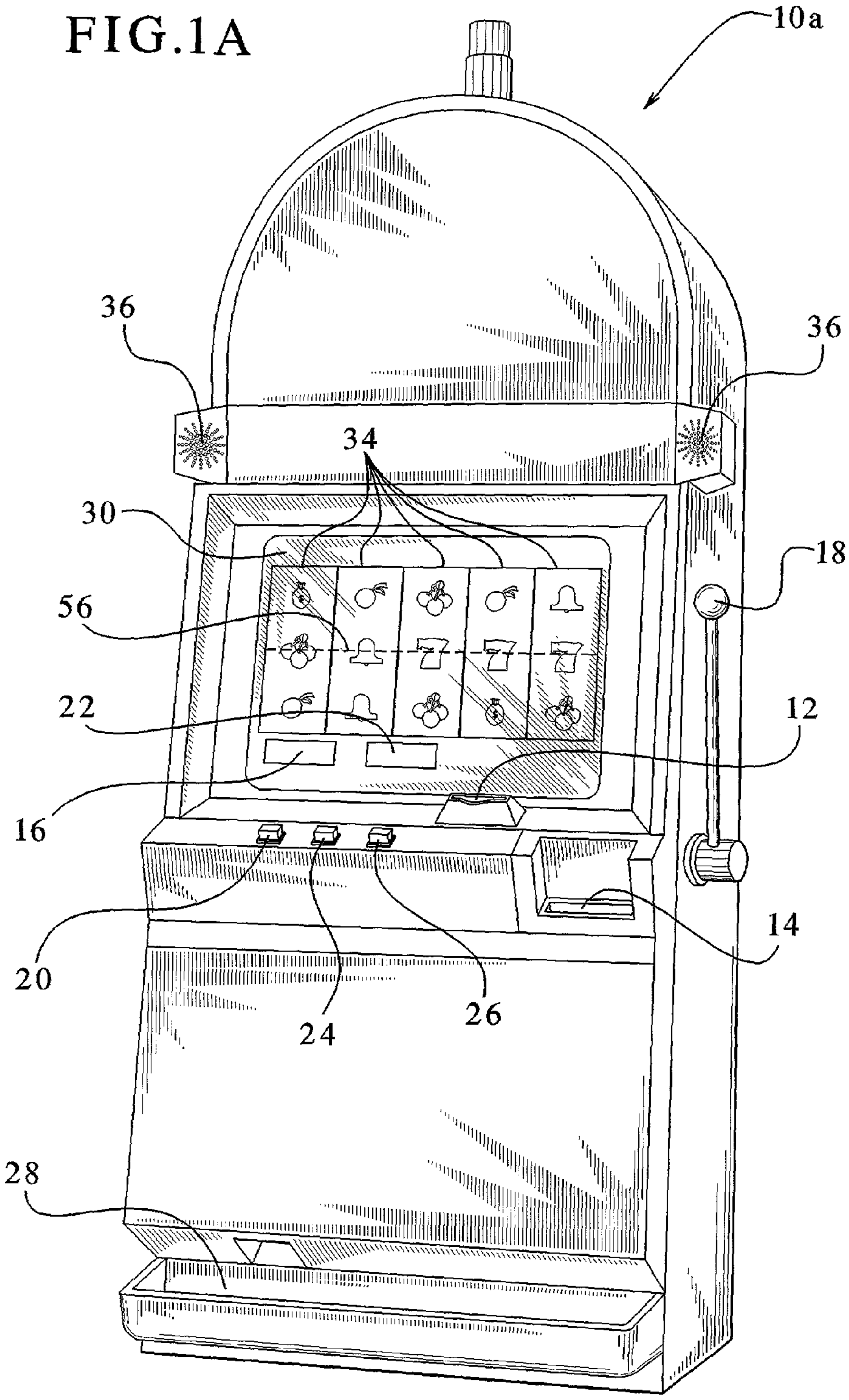
FIG. 1A is a front plan view of a general embodiment of the gaming device of the present invention.
Figure 1B:
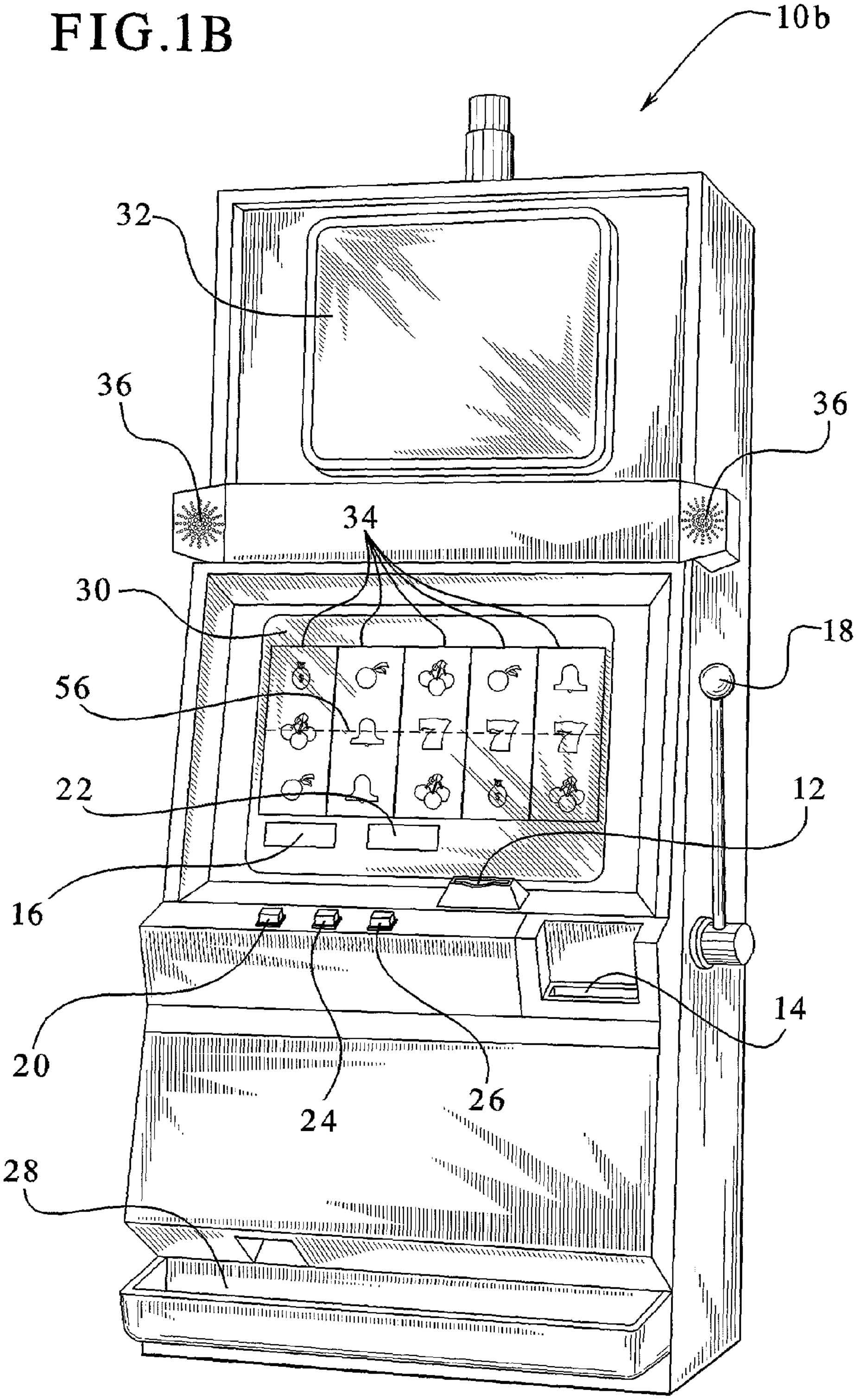
FIG. 1B is a front plan view of a second embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 generally includes a slot primary game and any suitable bonus triggering events. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
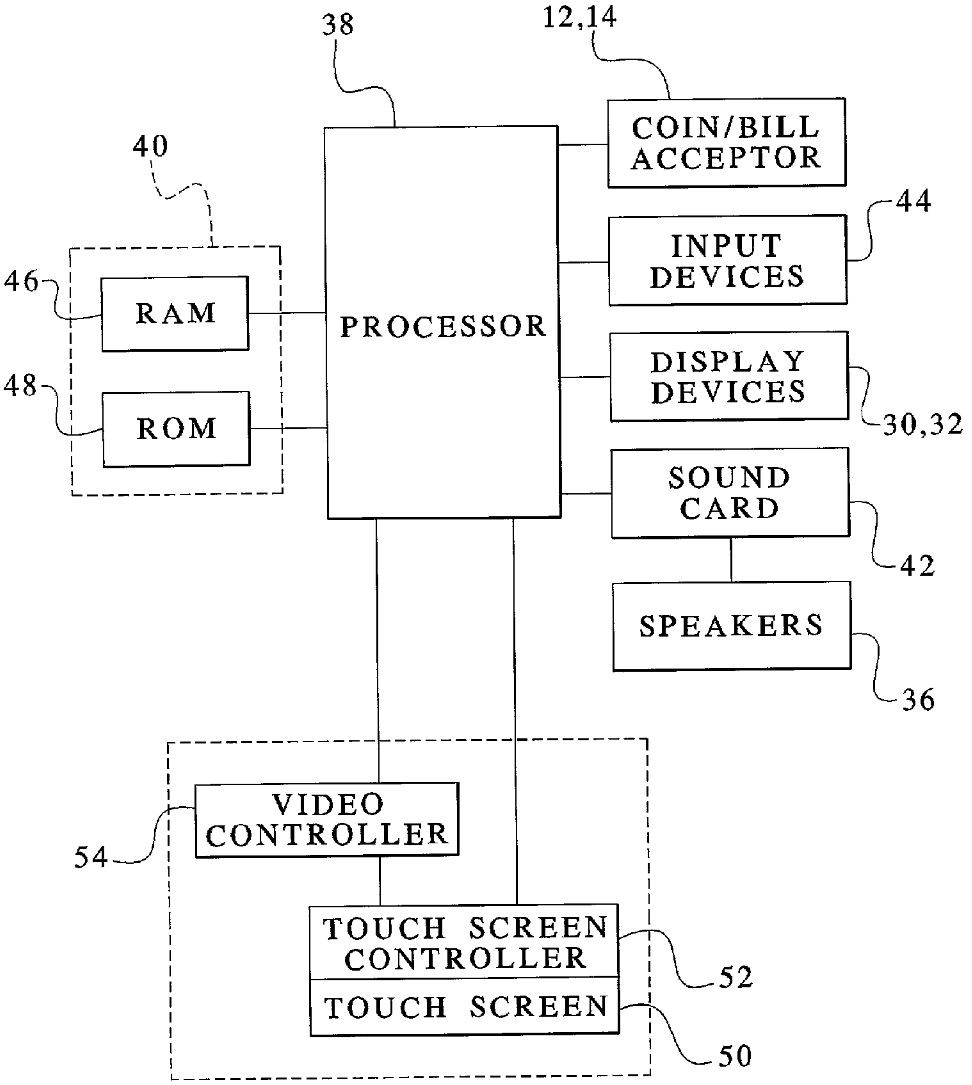
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 gives players the opportunity to win credits in a bonus round. The gaming device 10 includes a program or routine which will automatically begin a bonus round when the player has achieved a qualifying condition in the game. This qualifying condition can be a particular arrangement of indicia or symbols on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Figures 3, 4:
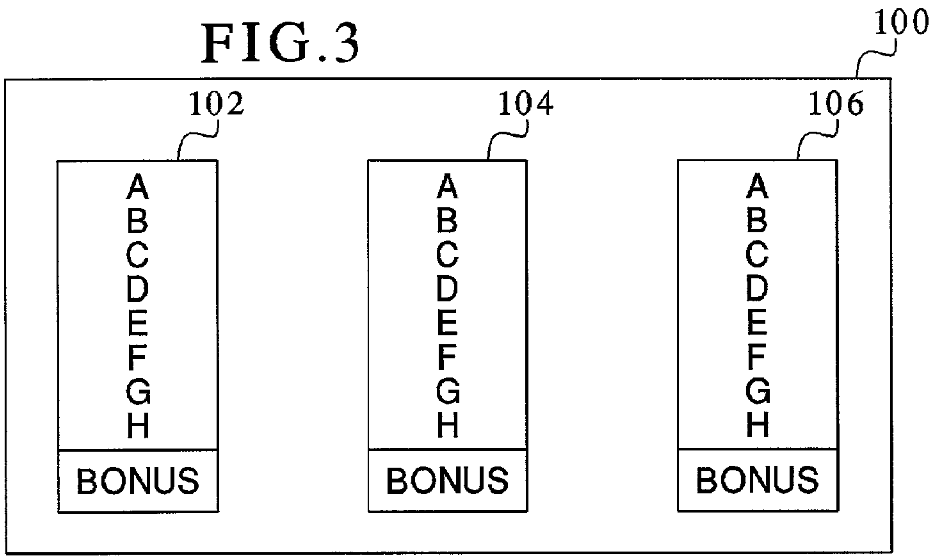
FIG. 3 is a plan view of the reel strips illustrating the symbols of the primary game of one embodiment of the gaming device of the present invention.
FIG. 4 is a plan view of a pay table associated with the symbols of the primary game of the embodiment of the gaming device of the present invention.
Figure 5:
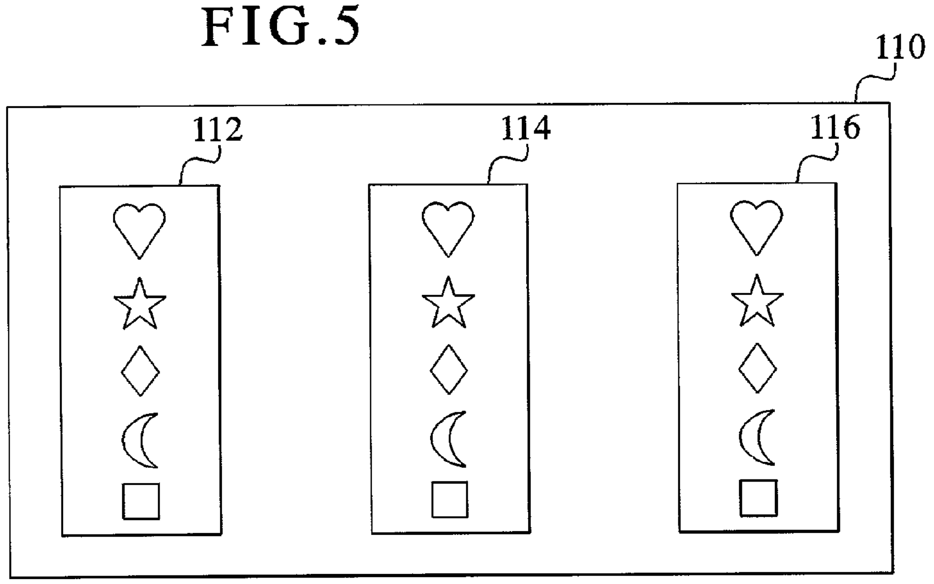
FIG. 5 is a plan view of the reel strips illustrating the symbols of the bonus game of one embodiment of the gaming device of the present invention.

Referring now to FIGS. 3 through 6, one preferred embodiment of the gaming device of the present invention includes two sets of reels 100 and 110. One set of reels 100 has one set of symbols as illustrated in FIG. 3 for a base or primary game. A completely different set of reels 110 having a different set of symbols as illustrated FIG. 5 are provided for a bonus or secondary game. The reels 102, 104 and 106 in the primary game, for example, may include symbols such as A through H and the reels 112, 114 and 116 in the secondary game, for example, may include symbols such as a heart, a star, a diamond, a moon and a square. It should be appreciated that any suitable symbols may be utilized in conjunction with the sets of reels as long as the sets of symbols are different. If the gaming device includes a single video display (FIG. 1A), both sets of reels may be displayed on the same display at different times. If the gaming device includes two video displays (FIG. 1B), two mechanical sets of reels (not shown) or a video display and a mechanical set of reels (not shown), the sets of primary reels 100 and secondary reels 110 may be displayed by the individual displays or mechanical devices. It should further be appreciated that multiple sets of reels could be provided for a plurality of bonus games, wherein each bonus game includes a different set of reels with a different set of symbols.

The number of reel symbols in each set of symbols is also preferably different. In particular, the set of reel symbols for the primary game preferably includes more reel symbols than the set of reel symbols for the secondary game. The probabilities of obtaining different combinations of reel symbols in the primary game and the bonus game are thus different. In particular, the probabilities of obtaining winning combinations in the bonus game are higher than the probabilities for obtaining winning combinations in the primary game because the bonus game has less reel symbols and therefore less possible combinations of reel symbols.

In the example illustrated in FIG. 4, the display 120 illustrates that if the combination of any three reel symbols such as A, A and A are obtained along a payline (not shown) in the primary game, the game pays the player one hundred times the player's wager. Likewise if the combination of any two matching reel symbols occurs along a payline (not shown), the game pays the player ten times the player's wager. Additionally, if any two bonus reel symbols appear on a payline the bonus game is triggered.

Figure 6:
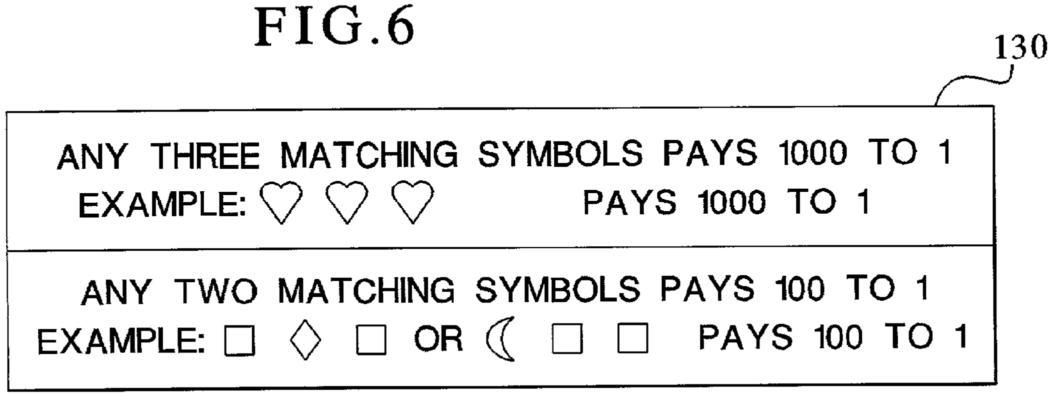
FIG. 6 is a plan view of a pay table associated with the symbols of the bonus game of the embodiment of the gaming device of the present invention.

Referring now to FIGS. 5 and 6, the number of reel symbols on each reel in the bonus game is less than the number of reel symbols on the reels in the base game (FIG. 3). By having less reel symbols in the bonus game, the probability, odds or chances of winning, in the bonus game increase over the probability of winning in the base game, because there are less possible combinations of reel symbols in the bonus game. Thus, a player is more likely to obtain a winning combination in the bonus game than in the base game.

Furthermore, in accordance with the present invention the award or payout for obtaining a winning combination in the bonus game is preferably greater than in the base game because the possibilities of larger awards excite players and enhance player enjoyment of the gaming device. In addition, the base game has a smaller probability of winning and therefore it is more difficult to get to the bonus game. As a result, the higher award or payout rewards the player for reaching the bonus game.

For example, FIGS. 3 to 6 illustrates the differences between a base game having one set of reel symbols and probability of winning, and a bonus game having a second set of reel symbols and higher probability of winning. In this example, the primary or base game has three reels 102, 104 and 106 each with eight reel symbols designated by the alphabetical characters, A through H. Also, there is a bonus symbol on each reel.

As shown in FIG. 4, if a player gets three matching symbols such as A, A and A on a payline in the base game, the gaming device pays the player 100 times the amount that the player wagered. Similarly, if the player gets any two matching symbols, such as B, B or B, D, B, on a payline in the base game, then the gaming device pays the player 10 times the amount that the player wagered. If a player matches any two bonus symbols along a payline, then a bonus game or bonus round is triggered. However, because there are nine reel symbols per reel, including a bonus symbol, there is a larger number of possible combinations of reel symbols and therefore, less chance of achieving the bonus combination and making it into the bonus game.

As shown in FIG. 5, once a player reaches the bonus game, a different set of reels 112, 114 and 116 are displayed and have five completely different reel symbols from the reel symbols in the base game. The bonus game reel symbols in this example are: a heart, a star, a diamond, a moon and a square.

In the bonus game, a player earns one free spin to try to earn an additional award that will increase the player's winnings. In other versions of the bonus game, a player may earn a plurality of spins. In this example, the player will gain an award in the bonus game if they match any two reel symbols or any three reel symbols on a payline. The probability or chances of winning in the bonus game increases because the bonus game has less reel symbols and therefore a greater likelihood that a player will match two or three reel symbols on a payline.

Furthermore, as illustrated in FIG. 6, the display 130 illustrates that if the player matches three reel symbols on a payline in the bonus game, the player wins 1000 times their wager amount. Similarly, if the player matches two reel symbols along a payline, the player wins 100 times their wager amount. The award or payout is greater in the bonus game than in the base game to increase the player's excitement and enjoyment of the gaming device.

Thus, using a different set of reel symbols in the bonus game eliminates any confusion that the player may have between the reel symbols in the primary game and the bonus game. Furthermore, the player's excitement and entertainment levels increase because the probability or chance of winning in the bonus game is greater than in the primary game.

In an alternative embodiment of the present invention, a plurality of bonus games are provided and the first and/or second set of symbols are adapted to trigger each of said bonus games. For example, such bonus games may include free spins of the primary game. Another example is where a bonus game is a paid for game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a display device;

a primary game adapted to be displayed by the display device;

a set of reels in the primary game including a plurality of primary symbols;

a plurality of primary awards associated with the primary symbols;

a first secondary game adapted to be displayed by said display device;

a set of reels in the first secondary game including a plurality of secondary symbols, wherein said secondary symbols include at least one different symbol than the primary symbols;

a second secondary game adapted to be displayed by the display device;

a plurality of secondary awards associated with the secondary symbols in each of the secondary games, wherein the secondary awards are different than the primary awards; and a processor which, in each play of the primary game, causes the display device to display the set of reels in the primary game, randomly determines the primary symbols indicated by the set of reels in the primary game, provides any primary awards associated with the primary symbols indicated on the reels in the primary game, causes the display device to replace the set of reels in the primary game with the set of reels in the first secondary game when a first triggering event occurs in the primary game, and after a first triggering event occurs in the primary game (i) randomly determines the secondary symbols indicated by the set of reels of the first secondary game, (ii) provides any secondary awards associated with the secondary symbols indicated on the reels in the first secondary game, and (iii) causes the display device to replace the set of reels in the first secondary game with the second secondary game when a second triggering event occurs in the first secondary game, wherein the primary game does not include a triggering event which directly causes the processor to cause the display device to display the second secondary game.

2. The gaming device of claim 1, wherein a plurality of the secondary symbols of the first secondary game are different than the primary symbols.

3. The gaming device of claim 1, wherein all of the secondary symbols of the first secondary game are different than the primary symbols.

4. The gaming device of claim 1, which includes less secondary symbols of the first secondary game than primary symbols.

5. The gaming device of claim 1, wherein the second secondary game includes second secondary game symbols which are different than the secondary symbols of the first secondary game.

6. The gaming device of claim 1, wherein at least one of the secondary awards is larger than all of the primary awards.

7. The gaming device of claim 1, wherein the secondary awards in the second secondary game are different than the secondary awards in the first secondary game.

8. The gaming device of claim 7, wherein at least one of the secondary awards in the second secondary game is greater than all of the secondary awards in the first secondary game.

9. The gaming device of claim 1, which includes a probability of obtaining a winning combination of symbols associated with each winning combination of the primary symbols in the primary game and each winning combination of the secondary symbols in the first secondary game, wherein the probabilities associated with the winning combinations of secondary symbols are different than the probabilities associated with the winning combinations of primary symbols.

10. The gaming device of claim 9, wherein at least one of the probabilities associated with the winning combinations of secondary symbols in the first secondary game is greater than all of the probabilities associated with the winning combinations of primary symbols in the primary game.

11. A gaming device comprising:

a base game including a set of reels having a plurality of base game symbols;

a plurality of base game awards associated with the base game symbols;

a first bonus game including a set of reels having a plurality of first bonus game symbols, wherein the first bonus game symbols of said first bonus game are different than the base game symbols of the base game and wherein the plurality of first bonus game symbols in the first bonus game is less than the plurality of base game symbols in the base game;

a second bonus game;

a plurality of bonus game awards associated with the bonus game symbols in each of the bonus games, wherein the bonus game awards are different than the base game awards;

a display device; and a processor in communication with the display device, which in each play of the base game, causes the display device to display the set of reels associated with the base game, randomly determines the displayed base game symbols, provides any base game awards associated with the base game symbols indicated on the reels in the base game, causes the display device to replace the set of reels associated with the base game with the set of the reels associated with the first bonus game when a first triggering event occurs in the base game, after a first triggering event occurs in the base game (i) randomly determines the displayed first bonus game symbols, (ii) provides any bonus game awards associated with the first bonus game symbols indicated on the reels in the first bonus game, (iii) causes the display device to replace the set of reels in the first bonus game with the second bonus game when a second triggering event occurs in the first bonus game, wherein the base game does not include a triggering event which causes the processor to directly provide the second bonus game.

12. The gaming device of claim 11, wherein a plurality of the first bonus game symbols in the first bonus game are different than the base game symbols.

13. The gaming device of claim 11, wherein the first bonus game symbols in the first bonus game are all different than the base game symbols.

14. The gaming device of claim 11, wherein at least one of the bonus game awards is larger than all of the base game awards.

15. The gaming device of claim 11, wherein the bonus game awards in the second bonus game are different than the bonus game awards in the first bonus game.

16. The gaming device of claim 15, wherein at least one of the bonus game awards in the second bonus game is greater than all of the bonus game awards in the first bonus game.

17. The gaming device of claim 11, which includes a probability of obtaining a winning combination of symbols associated with each winning combination of the base game symbols in the base game and each winning combination of the bonus game symbols in the first bonus game, wherein the probabilities associated with the winning combinations of bonus game symbols are different than the probabilities associated with the winning combinations of base game symbols.

18. The gaming device of claim 17, wherein at least one of the probabilities associated with the winning combinations of bonus game symbols in the first bonus game is greater than all of the probabilities associated with the winning combinations of base game symbols in the base game.

19. A gaming device comprising:

a primary game;

a set of primary reels in the primary game including a plurality of primary symbols;

a plurality of primary awards associated with the primary symbols;

a first secondary game;

a set of secondary reels in the first secondary game including a plurality of secondary symbols, wherein said secondary symbols of the first secondary game are different than the primary symbols and wherein the plurality of secondary symbols of the first secondary game is less than the plurality of primary symbols of the primary game;

a second secondary game;

a plurality of secondary awards associated with the secondary symbols in each of the secondary games, wherein the secondary awards are different than the primary awards;

a display device; and a processor in communication with the display device which in each play of the primary game, randomly determines the primary symbols indicated by the primary reels, provides any primary awards associated with the primary symbols indicated on the reels in the primary game, causes the display device to replace the primary reels with the secondary reels when a first triggering event occurs on the primary reels, after a first triggering event occurs on the primary reels (i) randomly determines the secondary symbols indicated by the secondary reels, (ii) provides any secondary awards associated with the secondary symbols indicated on the reels in the first secondary game, (iii) replaces the secondary reels in the first secondary game with the second secondary game when a second triggering event occurs on the secondary reels in the first secondary game, wherein the primary game does not include a first triggering event which causes the processor to directly provide the second secondary game.

20. The gaming device of claim 19, wherein all of the secondary symbols in the first secondary game are different than the primary symbols.

21. The gaming device of claim 19, which includes less secondary symbols in the first secondary game than the primary symbols.

22. The gaming device of claim 19, wherein at least one of the secondary awards is larger than all of the primary awards.

23. The gaming device of claim 19, wherein the secondary awards in the second secondary game are different than the secondary awards in the first secondary game.

24. The gaming device of claim 23, wherein at least one of the secondary awards in the second secondary game is greater than all of the secondary awards in the first secondary game.

25. The gaming device of claim 19, which includes a probability of obtaining a winning combination of symbols associated with each winning combination of the primary symbols in the primary game and each winning combination of the secondary symbols in the first secondary game, wherein the probabilities associated with the winning combinations of secondary symbols are different than the probabilities associated with the winning combinations of primary symbols.

26. The gaming device of claim 25, wherein at least one of the probabilities associated with the winning combinations of secondary symbols in the first secondary game is greater than all of the probabilities associated with the winning combinations of primary symbols in the primary game.

27. A method for operating a gaming device, said method comprising the steps of:

(a) displaying on a display device a primary game including a set of primary reels having a plurality of primary symbols;

(b) enabling a player to play the primary game;

(c) providing any primary awards associated with the primary symbols indicated on the primary reels in the primary game to a player;

(d) removing the primary reels from said display device;

(e) replacing on said display device the primary reels with a set of secondary reels of a first secondary game when a first triggering event occurs in the primary game, said secondary reels of the first secondary game including a plurality of secondary symbols which are different than the primary symbols and for the secondary reels (i) enabling the player to play the first secondary game on the display device;

(ii) providing any secondary awards associated with the secondary symbols indicated on the secondary reels in the first secondary game, wherein the secondary awards are different than the primary awards;

(iii) removing the secondary reels from said display device; and (iv) replacing on said display device the secondary reels of the first secondary game with a second secondary game when a second triggering event occurs in the first secondary game, wherein the primary game does not include a triggering event which directly causes the activation of the second secondary game.

28. The method of claim 27, which includes a greater number of primary symbols than secondary symbols in the first secondary game.

29. The method of claim 27, wherein the secondary symbols are all different than the primary symbols.

30. The method of claim 27, wherein the gaming device is operated through a data network.

31. The method of claim 30, wherein the data network is a computer data network.

32. The method of claim 27, wherein at least one of the secondary awards is larger than all of the primary awards.

33. The method of claim 27, wherein the secondary awards in the second secondary game are different than the secondary awards in the first secondary game.

34. The method of claim 29, wherein at least one of the secondary awards in the second secondary game is greater than all of the secondary awards in the first secondary game.

35. The method of claim 27, which includes a probability of obtaining a winning combination of symbols associated with each winning combination of the primary symbols in the primary game and each winning combination of the secondary symbols in the first secondary game, wherein the probabilities associated with the winning combinations of secondary symbols are different than the probabilities associated with the winning combinations of primary symbols.

36. The method of claim 35, wherein at least one of the probabilities associated with the winning combinations of secondary symbols in the first secondary game is greater than all of the probabilities associated with the winning combinations of primary symbols in the primary game.

37. A method for operating a gaming device, said method comprising the steps of:

(a) displaying on a display device a base game including a set of reels having a plurality of base game symbols;

(b) enabling a player to play the base game;

(c) providing any base game awards associated with the base game symbols indicated on the reels in the base game;

(d) removing the base game from said display device;

(e) replacing on said display device the base game with a first bonus game when a first triggering event occurs in the base game, said first bonus game including a set of reels having a plurality of first bonus game symbols, wherein the first bonus game symbols of said first bonus game are different than the base game symbols of the base game and wherein the plurality of first bonus game symbols in the first bonus game is less than the plurality of base game symbols in the base game and for the first bonus game:

(i) enabling a player to play the first bonus game;

(ii) providing any bonus game awards associated with the first bonus game symbols indicated on the reels in the first bonus game, wherein the bonus game awards are different than the base game awards;

(iii) removing said first bonus game from said display device; and (iv) replacing said first bonus game with a second bonus game when a second triggering event occurs in the first bonus game, wherein the base game does not include a triggering event which directly causes activation of the second bonus game.

38. The method of claim 37, wherein the first bonus game symbols are all different than the base game symbols.

39. The method of claim 17, wherein the gaming device is operated through a data network.

40. The method of claim 39, wherein the data network is a computer data network.

41. The method of claim 37, wherein at least one of the bonus game awards is larger than all of the base game awards.

42. The method of claim 37, wherein the bonus game awards in the second bonus game are different than the bonus game awards in the first bonus game.

43. The method of claim 42, wherein at least one of the bonus game awards in the second bonus game is greater than all of the bonus game awards in the first bonus game.

44. The method of claim 37, which includes a probability of obtaining a winning combination of symbols associated with each winning combination of the base game symbols in the base game and each winning combination of the bonus game symbols in the first bonus game, wherein the probabilities associated with the winning combinations of bonus game symbols are different than the probabilities associated with the winning combinations of base game symbols.

45. The method of claim 44, wherein at least one of the probabilities associated with the winning combinations of bonus game symbols in the first bonus game is greater than all of the probabilities associated with the winning combinations of base game symbols in the base game.

46. A method for operating a gaming device, said method comprising the steps of:

(a) displaying on a display device a primary game including a set of primary reels having a plurality of primary symbols;

(b) enabling a player to play the primary game;

(c) providing any primary awards associated with the primary symbols indicated on the primary reels in the primary game to a player;

(d) removing the primary game from said display device;

(e) replacing on said display device the primary game with a first secondary game when a first triggering event occurs on the primary reels, said secondary game including a set of secondary reels having a plurality of secondary symbols, wherein said secondary symbols of the first secondary game are different than the primary symbols and wherein the plurality of secondary symbols of the first secondary game is less than the plurality of primary symbols of the primary game, and for the first secondary game:

(i) enabling a player to play the first secondary game;

(ii) providing any secondary awards associated with the secondary symbols indicated on the secondary reels in the first secondary game, wherein the secondary awards are different than the primary awards;

(iii) removing said first secondary game from said display device; and (iv) replacing said first secondary game with a second secondary game when a second triggering event occurs on the secondary reels in the first secondary game, wherein the primary game does not include a triggering event which directly causes activation of the second secondary game.

47. The method of claim 46, wherein the secondary symbols are all different than the primary symbols.

48. The method of claim 46, wherein the gaming device is operated through a data network.

49. The method of claim 48, wherein the data network is a computer data network.

50. The method of claim 46, wherein at least one of the secondary awards is larger than all of the primary awards.

51. The method of claim 46, wherein the secondary awards in the second secondary game are different than the secondary awards in the first secondary game.

52. The method of claim 51, wherein at least one of the secondary awards in the second secondary game is greater than all of the secondary awards in the first secondary game.

53. The method of claim 46, which includes a probability of obtaining a winning combination of symbols associated with each winning combination of the primary symbols in the primary game and each winning combination of the secondary symbols in the first secondary game, wherein the probabilities associated with the winning combinations of secondary symbols are different than the probabilities associated with the winning combinations of primary symbols.

54. The method of claim 53, wherein at least one of the probabilities associated with the winning combinations of secondary symbols in the first secondary game is greater than all of the probabilities associated with the winning combinations of primary symbols in the primary game.

55. A gaming device comprising:

a display device;

a primary game adapted to be displayed by the display device;

a set of reels in the primary game including a plurality of primary symbols;

a probability of obtaining a winning combination of primary symbols associated with each winning combination of the primary symbols;

a first secondary game adapted to be displayed by said display device;

a set of reels in the first secondary game including a plurality of secondary symbols, wherein said secondary symbols include at least one different symbol than the primary symbols;

a second secondary game adapted to be displayed by the display device;

a probability of obtaining a winning combination of secondary symbols associated with each winning combination of the secondary symbols, wherein the probabilities associated with the winning combinations of the secondary symbols are different than the probabilities associated with the winning combinations of the primary symbols; and a processor which in each play of the primary game, causes the display device to display the set of reels in the primary game, randomly determines a winning combination of the primary symbols on the reels in the primary game based on the probabilities associated with the winning combinations of the primary symbols, causes the display device to remove the set of reels in the primary game from the display device and replace the set of reels in the primary game with the set of reels in the first secondary game when a first triggering event occurs in the primary game, after a first triggering event occurs in the primary game (i) randomly determines a winning combination of the secondary symbols on the reels in the first secondary game based on the probabilities associated with the winning combinations of the secondary symbols, and (ii) causes the display device to remove the set of reels in the first secondary game from the display device and replace the set of reels in the first secondary game with the second secondary game when a second triggering event occurs in the first secondary game, wherein the primary game does not include a triggering event which directly causes the processor to cause the display device to display the second secondary game.

56. The gaming device of claim 55, wherein at least one of the probabilities associated with the winning combinations of secondary symbols in the first secondary game is greater than all of the probabilities associated with the winning combinations of primary symbols in the primary game.

57. The gaming device of claim 55, wherein the probabilities associated with winning combinations of secondary symbols in the second secondary game are different than the probabilities associated with winning combinations of secondary symbols in the first secondary game.

58. The gaming device of claim 57, wherein at least one of the probabilities associated with the winning combinations of secondary symbols in the second secondary game is greater than all of the probabilities associated with the winning combinations of secondary symbols in the first secondary game.

59. A gaming device comprising:

a base game including a set of reels having a plurality of base game symbols;

a probability of obtaining a winning combination of base game symbols associated with each winning combination of the base game symbols;

a first bonus game including a set of reels having a plurality of bonus game symbols, wherein the bonus game symbols of said first bonus game are different than the base game symbols of the base game and wherein the plurality of bonus game symbols in the first bonus game is less than the plurality of base game symbols in the base game;

a second bonus game;

a probability of obtaining a winning combination of bonus game symbols associated with each winning combination of the bonus game symbols, wherein the probabilities associated with the winning combinations of the bonus game symbols are different than the probabilities associated with the winning combinations of the base game symbols;

a display device; and a processor in communication with the display device, which in each play of the base game, causes the display device to display the set of reels associated with the base game, randomly determines a winning combination of the base game symbols based on the probabilities associated with the winning combinations of base game symbols, causes the display device to remove the set of reels associated with the base game and replace the set of reels associated with the base game with the set of the reels associated with the first bonus game when a first triggering event occurs in the base game, after a first triggering event occurs in the base game (i) randomly determines a winning combination of bonus game symbols in the first bonus game based on the probabilities associated with the winning combinations of the bonus game symbols and (ii) provides the second bonus game to the player when a second triggering event occurs in the first bonus game, wherein the base game does not include a triggering event which directly causes the processor to provide the second bonus game.

60. The gaming device of claim 59, wherein at least one of the probabilities associated with the winning combinations of bonus game symbols in the first bonus game is greater than all of the probabilities associated with the winning combinations of base game symbols in the primary game.

61. The gaming device of claim 59, wherein the probabilities associated with winning combinations of bonus game symbols in the second bonus game are different than the probabilities associated with winning combinations of bonus game symbols in the first bonus game.

62. The gaming device of claim 61, wherein at least one of the probabilities associated with the winning combinations of bonus game symbols in the second bonus game is greater than all of the probabilities associated with the winning combinations of bonus game symbols in the first bonus game.

* * * * *

UNITED STATES PATENT AND TRADEMARK OFFICE

CERTIFICATE OF CORRECTION

PATENT NO. : 7,052,395 B2
APPLICATION NO. : 10/098691
DATED : May 30, 2006
INVENTOR(S) : Paulina Glavich et al.

It is certified that error appears in the above-identified patent and that said Letters Patent is hereby corrected as shown below:

IN THE CLAIMS:

In Claim 34, column 11, line 36, change "claim 29" to --claim 33--.

Signed and Sealed this

Twenty-third Day of January, 2007

JON W. DUDAS
*Director of the United States Patent and Trademark Office*